METAL FILM RESISTOR AND METHOD OF ITS FORMATION
Filed March 9, 1961
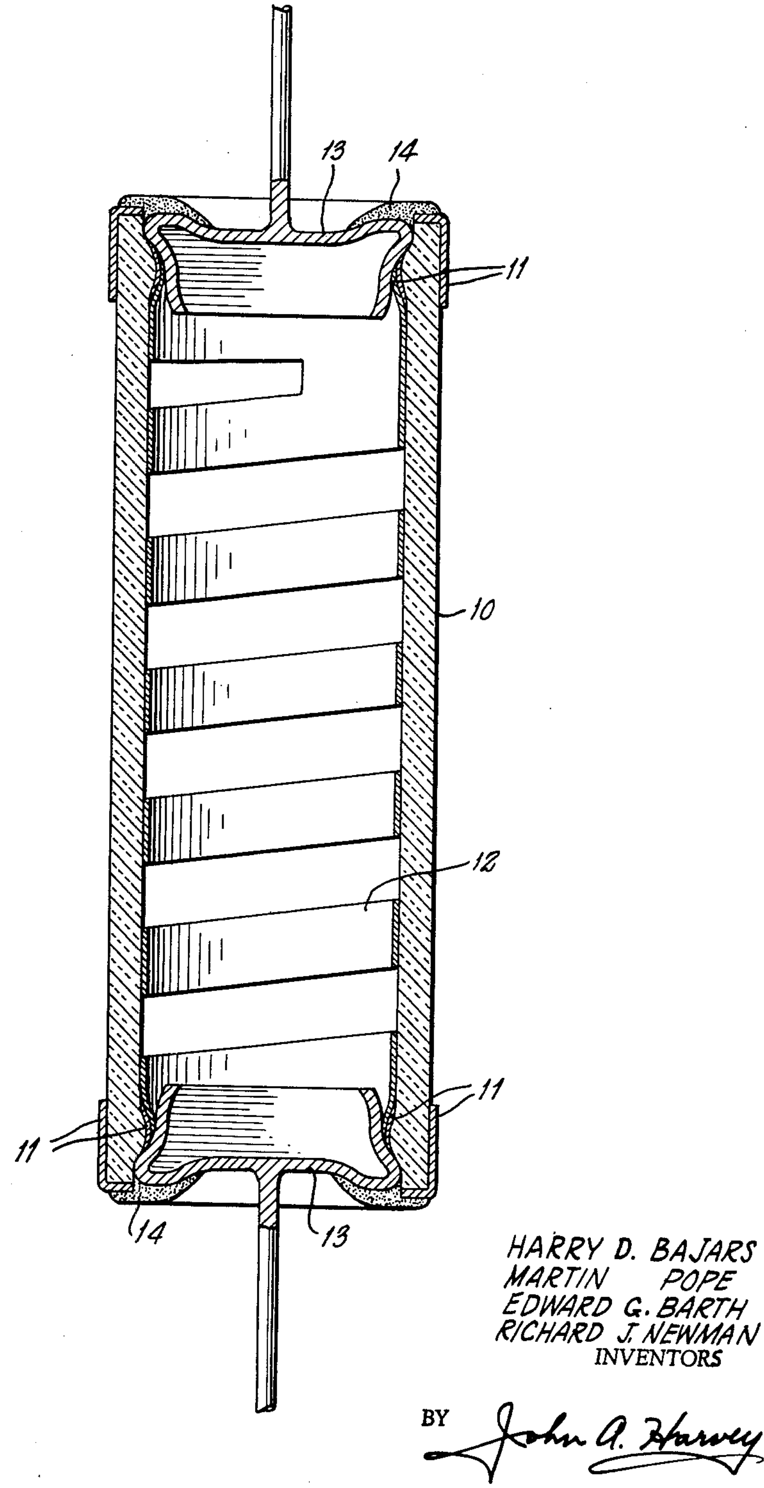
HARRY D. BAJARS
MARTIN POPE
EDWARD G. BARTH
RICHARD J. NEWMAN
INVENTORS
BY John A. Harvey
ATTORNEY United States Patent Office 3,189,482

Patented June 15, 1965

3,189,482
METAL FILM RESISTOR AND METHOD OF ITS FORMATION

Harry D. Bajars, Livingston, N.J., Martin Pope, Brooklyn, N.Y., and Edward G. Barth, Union, and Richard J. Newman, West Orange, N.J., assignors, by mesne assignments, to General Mills, Inc., Minneapolis, Minn., a corporation of Delaware Filed Mar. 9, 1961, Ser. No. 94,492
9 Claims. (Cl. 117—212)

This invention relates to metal films, metal film resistors, compositions useful in the preparation and the manufacture of metal films and metal film resistors and methods of preparing such metal film resistors. More particularly, this invention relates to metal film resistors comprising as the resistor element metal film or deposit of metal having relatively high electrical resistivity and improved thermal stability. Still more particularly, this invention relates to metal films and resistors employing said metal films having improved and desirable electrical properties, such as relatively high resistivity, low temperature coefficient, relatively long life and improved chemical and physical properties, particularly with respect to being able to withstand relatively high temperatures without substantial deterioration.

In the manufacture of electronic instruments, apparatus and components, it is desirable to employ materials and components which are durable, exhibit long useful life, are rugged and are relatively unaffected by the environment in which these materials or components are employed. It is also desirable to employ materials and components capable of satisfactorily carrying out their functions even when these components or materials have been miniaturized.

Accordingly, it is an object of this invention to provide an improved material or component useful in electrical or electronic equipment and the like.

It is another object of this invention to provide an improved metallic film.

Still another object of this invention is to provide an improved metal film resistor.

Still another object of this invention is to provide compositions useful in the manufacture of metal film resistors.

Yet another object of this invention is to provide an improved method for the manufacture of metal films or deposited metal particularly useful in the manufacture of metal film resistors.

How these and other objects of this invention are achieved will become apparent in the light of the accompanying disclosure made with reference to the accompanying drawing wherein there is schematically illustrated in cross section a hermetically sealed metal film resistor manufactured in accordance with this invention.

It has now been discovered that superior metal films and resistors, such as metal film resistors, are provided by depositing or causing to be deposited on a supporting surface or substrate an intimate metallic film of gold, palladium and iron, particularly an intimate substantially homogeneous film of metallic gold, metallic palladium and metallic iron in proportions in the range about 20–70% by weight gold, 20–70% by weight palladium and 0.1–20% by weight iron, based on the composite of these metals, such as proportions in the range 40–60%, 30–50% and 4–15%, Au-Pd-Fe, respectively. Of particular utility is an intimate homogeneous film of metallic gold, metallic palladium and metallic iron in the proportions about 54:36:10 parts by weight, respectively.

The intimate homogeneous film of the metallic elements, gold, palladium and iron, is obtained and deposited on a suitable substrate in accordance with this invention by forming a solution of compounds of these elements, applying the resulting solution containing these metallic elements onto a suitable substrate, subjecting the resulting applied or deposited solution to conditions, such as an elevated temperature, to decompose the respective compounds of gold, palladium and iron in said solution to cause to be deposited, as an intimate, substantially homogeneous film, elemental metallic gold, palladium and iron. Desirably, the resulting deposited metallic film of gold, palladium and iron is subjected to an oxidizing treatment, such as by exposing the thus deposited metallic film to elemental oxygen, such as air, at a relatively high temperature and for a sufficient period of time to form a surface film of the corresponding oxides of said elements on the resulting deposited metallic film.

In the practice of this invention it is preferred to employ as the compounds of gold, palladium and iron, the resinates or resin acid salts of gold, palladium and iron. Gold resinate, palladium resinate and iron resinate have been found to be particularly useful in the practice of this invention since these resinates upon exposure to a relatively high temperature, such as a temperature sufficient to thermally decompose these resinates but below the melting point of the lowest melting metal of the abovementioned metals (gold, iron and palladium), e.g., a temperature in the range 300–600° C., more or less, readily thermally decompose to deposit the corresponding metallic component thereof, gold, palladium or iron.

Resin acids are derivable from resins which are solid or semi-solid, amorphous, relatively high molecular weight, e.g., above about 200, materials which soften and melt on application to heat but not at any definite temperature. Resins containing resin acids include the natural resins, such as gum resin and the like, which are chiefly of plant origin, usually yellow to brown color, soluble in alcohol, ether and aromatic solvents but insoluble in water. Natural resins are chiefly secretion products and exude from plants alone or as mixtures with essential oils (esters), gums, etc. The term resins is also applicable to synthetic products of various types of chemical compounds or mixtures which possess many of the properties of natural resins.

Organic acids or resin acids derived from resins include such high molecular weight acids are pimaric acid, saponic acid, colophonic acid and sylvic acid, as well as abietic acid, dihydroabietic acid, dehydroabietic acid and mixtures thereof.

Other gold, palladium and iron-containing compounds, particularly salts, such as salts of high molecular weight organic acids, may be employed in the practice of this invention. It is desirable, however, that these gold, palladium and iron-containing compounds are capable of being thermally decomposed at a reasonably low temperature, not greater than about 600° C., such as a temperature of about 375° C., to yield, when thermally decomposed in a reducing, non-oxidizing environment, such as in the presence of hydrogen-containing gas, corresponding metallic gold, palladium and iron in the substantial absence of the oxides of these elements.

In the preparation of the solutions of the gold-containing, palladium-containing and iron-containing compounds any suitable solvent may be employed provided, of course, it is capable of dissolving the aforementioned metallic compounds to the desired extent. By employing a mixture of suitable solvents desirable wetting characteristics, drying or evaporation characteristics, viscosity characteristics and film-forming characteristics are obtainable. Particularly useful as solvents are the halogenated hydrocarbons, such as chloroform, dibromomethane, ethylene chloride, particularly the halo-carbons, such as carbon tetrachloride, as well as chloroform, dibromomethene, also such aromatic hydrocarbon solvents as benzene, toluene, the xylenes, turpentine, as well as such materials as terpenes and their derivatives, such as cineole, anethole, dipentene and the like. Generally, any solvent or mixture of solvents such as cineole and carbon tetrachloride, can be employed in the preparation of solutions in accordance with this invention provided the solvent or solvent mixture possesses the necessary solvent power for the gold, palladium or iron compound or mixtures thereof to be dissolved and the resultant solution possesses the desired physical characteristics so that it can be readily and conveniently applied to a surface on a suitable substrate to deposite a film or line or band thereon of the applied solution.

In accordance with one feature of this invention there is advantageously admixed with the solution of gold, palladium and iron-containing compounds a minor amount of an organic material such as a high molecular weight hydrocarbon which undergoes thermal decomposition to yield a carbonaceous or carbon residue. Particularly suitable is natural rubber material, such as pale crepe rubber, preferably unmodified pale crepe rubber. It has been found that such materials when present in the solutions of this invention in a minor amount are useful in imparting desirable temperature characteristics to the metal film or metallic deposits derivable therefrom upon heating to a temperature sufficiently high to thermally decompose not only the metallic compounds present in the solution but also the added modifying compound.

The added modifier material, as indicated hereinabove, is present in a minor amount, usually in an amount less than about 20% by weight, usually less than 5%, based on the solution, more usually an amount in the range 0.1–2.5% by weight of the solution depending upon the physical characteristics and properties desired not only in the resulting solution but also in the resulting deposited metallic material.

In the practice of this invention any suitable substrate upon which the solution is applied or deposited may be employed. The substrate material, at least that portion thereof in contact with the solution applied thereto, is desirably inert with respect to the ingredients or components of the solution and during the subsequent heat treatment step wherein the metallic-containing compounds dissolved in the applied solution are thermally decomposed. Also, the substrate material must be inert with respect to the resulting deposited metallic elements. The substrate material in addition to being inert is desirably, also, relatively refractory, i.e., is able to withstand high temperatures without undergoing any adverse effects. Particularly suitable as substrate materials are materials such as glass, e.g., lead glass, refractory ceramic materials, such as alumina and the like. In effect, any inert, refractory material, preferably non-electrically conductive material, may be employed as the substrate material upon which solutions in accordance with this invention are deposited.

The solutions prepared in accordance with this invention may contain dissolved therein any suitable amount of the gold, palladium, iron-containing compounds, such as gold resinate, palladium resinate and iron resinate. Usually satisfactory results are obtainable when a solution containing these compounds in only a minor amount is employed, such as a solution containing a gold compound, a palladium compound and an iron compound dissolved therein to the extent that the total metallic content of the resulting solution is not greater than about 15% by weight, more or less, such as an amount in the range 0.5–10%, e.g., about 6%, by weight total metal content.

Following the application for the metal-containing solution upon a substrate material the resulting applied solution is subjected to an elevated temperature sufficiently high to thermally decompose the metallic-containing compounds therein to derive therefrom, deposited on the substrate material, the corresponding metallic elements, gold, palladium and iron. The temperature employed during this thermal decomposition or heat treatment operation should be at least sufficient to substantially completely thermally decompose the metallic compounds dissolved in the applied solution but should not be greater than the melting point of the substrate material upon which the solution is applied. Usually, a heat treatment temperature in the range 300–600° C., more or less, e.g., a temperature in the range 450–525° C., is sufficient to effect thermal decomposition of the metallic compounds. Higher or lower temperatures, of course, may be employed depending upon the thermal decomposition temperatures of the metallic compounds and/or the melting or softening point of the substrate material upon which the solution is applied. The thermal decomposition or heat treatment operation is carried out in a non-oxidizing, reducing atmosphere, preferably in a hydrogen-containing atmosphere, such as an atmosphere comprising substantially only hydrogen or one which contains a substantial amount, above about 10% by volume, hydrogen. It has been found that a gas comprising 85% by volume nitrogen and 15% by volume hydrogen is particularly useful during the thermal decomposition or heat treatment operation to provide a non-oxidizing, reducing atmosphere. If desired an atmosphere comprising all or part of an inert gas, such as helium, argon, natural gas, e.g., methane, etc., may also be employed.

Following the heat treatment operation, with the resulting deposition of an intimate, homogeneous metallic film of gold, palladium and iron upon the substrate material, the resulting heat treated substrate material is removed from the heat treatment zone and permitted to cool in contact with air. Upon cooling the heat treated substrate material containing the metallic film deposited thereon is again heated to an elevated temperature, such as a temperature in the range 300–600° C., more or less, e.g., a temperature in the range 450–525° C., in the presence of an oxygen-containing gas, such as air. The purpose of this subsequent heat treatment operation in the presence of an oxygen-containing gas is to provide a film of metal oxide on the deposited film of metallic elements. If desired, the substrate material after heat treatment in the presence of a gaseous reducing atmosphere can be directly, without intervening cooling, heated in the presence of an oxidizing atmosphere, oxygen or oxygen-containing gas, e.g., air.

The above-described sequence of heat treatment operations, thermal decomposition followed by oxidation, is repeated again in the same sequence and under substantially the same conditions of temperature and time to assure the substantially complete thermal decomposition of the metallic-containing compounds applied to the substrate material and to provide on a resulting deposited film of metallic elements an oxide film thereover.

The temperatures and time of duration of the above-described thermal decomposition and oxidizing heat treatments can be varied, more or less. Higher heat treatment temperatures tend to reduce the time required for satisfactory heat treatment, and, conversely, low heat treatment temperatures tend to increase the time required for suitable heat treatment. Although it is preferred in the practice of this invention to carry out the heat treatment operations twice in the sequence, heat treatment in the presence of reducing atmosphere followed by another heat treatment in the presence of air or oxygen-containing atmosphere, additional, one or more, combinations of heat treatment operations may be employed depending upon the characteristics desired in the resulting treated material. Also, a single sequence of heat treatment steps, thermal reduction followed by an oxidizing heat treatment operation, might be employed. It has been found that when the thermal decomposition heat treatment operation is carried out at a temperature of about 375° C., such as a temperature in the range 300–500° C., the time required for this operation to effect satisfactory thermal decomposition is usually in the range 5–50 minutes, e.g., about 8–10 minutes, more or less. When the oxidation heat treatment operation, the second heat treatment operation in the sequence of a first heat treatment for thermal decomposition followed by a second heat treatment for oxidation, is carried out at a temperature of about 375° C., such as a temperature in the range 300–500° C., the time required to produce a satisfactory oxide film on the previously deposited metallic gold, palladium and iron is usually about 5–50 minutes, more or less, such as about 8–10 minutes. Desirably, the temperatures employed during the sequence of heat treatment operations and the time of duration of each operation is substantially the same.

The following is exemplary of the practice of this invention:

An amount of gold resinate was dissolved in carbon tetrachloride to yield a solution containing about 10% by weight gold. Also, an amount of palladium resinate was dissolved in carbon tetrachloride to yield a solution containing about 8% by weight palladium. Further, an amount of iron resinate was dissolved in a suitable solvent to yield a solution containing about 6% $Fe_2O_3$. Portions of the above solutions were added together to yield a stock solution having a combined metal content (gold, palladium and iron) of about 8% by weight, based on said solution, said metallic elements being present in the proportions about 54 parts by weight gold, 36 parts by weight palladium and 10 parts by weight iron.

To an amount of the above-identified stock solution was added pale crepe rubber and cineole as additional solvent to yield a solution containing 6% by weight metal (gold, palladium and iron) in the above-mentioned proportions, 1% by weight pale crepe rubber (unmodified) and 20% cineole as a supplementary solvent, the remaining portion of the solution comprising carbon tetrachloride.

This solution was then applied to a glass surface, such as lead glass, the resulting glass surface containing the solution applied thereto was then heated in the heat treatment zone in an atmosphere comprising 85% nitrogen and 15% hydrogen for 10 minutes at a temperature of about 500° C. Following this heat treatment operation the glass was removed and allowed to cool in air. Upon cooling the glass was again heated in the heat treatment zone, this time in the presence of air at a temperature of 375° C. for about 8 minutes. The above sequence of heat treatments was again carried out.

There was produced as a result of the above-described operations a glass surface having deposited thereon an intimately adherent metallic film of gold, palladium and iron. This deposited film had a resistance of about 28 ohms per square and a temperature coefficient in the range −65° to 180° C. less than +50 p.p.m./° C. and exhibited superior properties when employed as an electrical resistor or resistance element in an electric circuit.

Referring now to the accompanying drawing, there is illustrated therein a metal film resistor of a type suitably manufactured in accordance with and employing the compositions of this invention. As illustrated in the drawing a glass cylinder 10 has its ends coated with an intimately adherent conductive metal film 11 which extends for a short distance axially along the inside surface of the cylinder and may also extend over the end surfaces and for a short distance along the outside end surface of the cylinder. This metallic film is conveniently provided by dipping each end of the cylinder 11 in a conventional silver paint which is then heat treated in conventional manner to bond it to the surface of the cylinder. Thereafter the glass cylinder 10 has deposited on the interior wall thereof a metallic resistive film 12 of gold, palladium and iron in the proportions 54:36:10 by weight, respectively. The latter film for lower values of resistance may be a continuous uninterrupted film extending from end to end of the cylinder, or in the higher values of resistance may be formed of spiral configuration in a manner presently to be described. In either event, the resistive film 12 continues sufficiently far at its ends as to overlay (preferably as a continuous circumferential band) the end metal films 11. After heat treatment of the resistive film 12 in the manner previously described, the resistive film 12 will be found to be electrically and mechanically bonded to the metal film 11 and end terminal caps 13 of metal are inserted in the ends of the cylinder 10 into electrical engagement with the metal film 11. These end caps are then heated for a brief interval to provide a glass to metal seal upon cooling in a manner more fully disclosed in application Serial No. 94,558, filed on March 9, 1961, and now abandoned. As also disclosed in this copending application, a further hermetic seal is preferably provided at each end of the cylinder 10 by use of a ring or end covering of low melting temperature solder glass 14 fused to molten state to the terminal caps 13 and to the end surfaces of the cylinder 10. The glass to metal seal between each end terminal cap 13 and the cylinder 10 breaks the metal film 11 at the circumferential region of the seal, but each end metal film 11 remains in electrical engagement with its associated terminal cap so that a continuous electrical circuit prevails between the end caps 13 through the spiral resistive film 12.

In the manufacture of the resistor device illustrated in the drawing, any suitable means for applying the metal-containing solution to the surface of the substrate, such as the interior surface of glass cylinder 10, may be employed. For example, a continuous spiral of solution may be directly applied to the surface to be covered by a suitable "writing" pen or other similar means may be used for dispensing the solution in desired amount. If desired, the complete surface of the substrate or the interior surface of the glass cylinder 10 may be sprayed with the solution to form a film or continuous coating of solution thereon and the resulting solution then, before firing, removed from certain portions of the surface. Alternatively, the complete, continuous film of applied solution can be dried and heat treated directly on the surface to which it is applied and then by suitable means, such as by means of cutting tools, portions of the resulting deposited metallic film can be removed to provide the desired configuration such as a spiral configuration terminating in end concentric bands or rings as above described. The physical and electrical properties of the deposited and heat treated metal film may be controlled by varying the amount of solution deposited per unit area and the composition of the solution as herein described.

Further exemplary of the practices of this invention, metal films having the composition and characteristics set forth in accompanying Table No. 1 were prepared in the manner described hereinabove. The applied metal-containing solution which produced these metal films were fired on suitable substrate material at a temperature of about 500° C. for 10 minutes in a gaseous atmosphere comprising 85% by volume nitrogen and 15% by volume hydrogen, followed by air firing at a temperature of 370° C. for a period of 8 minutes. The above firings were again repeated for a total of two cycles.

*Table No. 1*

| Film Composition, Percent by Weight | | | Temperature Coefficient, (25–150° C.) p.p.m./° C. |
|---|---|---|---|
| Au | Pd | Fe | |
| 40 | 50 | 10 | +293 |
| 51 | 34 | 15 | +2,000 |
| 52.8 | 35.2 | 12 | +70 |
| 53.4 | 35.6 | 11 | +3 |
| 54 | 36 | 10 | −30 |
| 58 | 34 | 8 | −20 |
| 57 | 35 | 5 | +244 |
| 58.5 | 31.5 | 10 | +85 |

Still further exemplary of the practices of this invention for the manufacture of a metal film having a resistance temperature coefficient of +50 p.p.m./° C., substrate material, such as lead glass, was coated with a liquid film comprising 6.5% by weight metal, gold, palladium and iron, in the proportions 54, 36, 10, respectively, and in the form of the corresponding metal resinates, and containing a minor amount by weight of unmodified pale crepe rubber, such as is provided by 1% Hanovia Medium H1-111 and 15% by weight cineole, all dissolved or admixed in carbon tetrachloride. The resulting liquid film-coated substrate material is then placed in an atmosphere comprising 85% by volume nitrogen and 15% by volume hydrogen and heated therein at a temperature of 500° C. for 10 minutes. The substrate material is then removed and rapidly cooled in air. The resulting material is then heated in air at a temperature of 370° C. for 8 minutes and again removed and cooled. Both these heating operations are again repeated.

In the above-described firing operations the first firing or heat treatment step in the presence of gaseous nitrogen and hydrogen converts the metal resinate mixture in the applied liquid film substantially completely to metal. It was observed that the rate of conversion to metal appears to slow down after an initial rapid rate of conversion, after about 3 minutes, to the extent that after approximately 30 minutes of heating the temperature coefficient and resistivity of the deposited metal film change very little with time. Upon placing this heated material into contact with air and firing, oxidation takes place with the formation of the corresponding metal oxides. The first air firing operation serves to insure substantially complete reaction between the oxygen in the air and the metals in the film. During the second heat treatment operation in the presence of gaseous nitrogen and hydrogen it was observed that the resistivity of the metal film decreased rapidly to the extent of about 50% of the value before the second firing. It appears that this reduction in resistivity might be due to the reduction of excess metal oxides in the film and to a reorientation of the metal film structure. Also, during this second firing in the presence of nitrogen and hydrogen it was observed that the temperature coefficient of the metal film initially decreased at a very rapid rate and that after about 5 minutes the rate of decrease leveled out and the temperature coefficient then decreased at a more moderate rate. It was observed that during this time the resistivity begins a rapid increase and after that, about 8 minutes, changes at a more moderate uniform rate. The second air firing operation, however, seems to have little effect upon the metal film properties and appears to be primarily effective as a film stabilization operation.

It has also been observed in the preparation of the metal films in accordance with this invention that the electrical properties of the metal films can be modified after the completion of the series of firing operations in a hydrogen-containing atmosphere and in an oxygen-containing atmosphere by a subsequent, added firing operation in the presence of air or other oxygen containing gas or in the presence of an inert gas, such as helium. The effect of an added, subsequent heat treatment operation in the presence of an inert gas, such as helium, upon the resistivity and temperature coefficients of metal films are set forth in accompanying Table No. 2:

*Table No. 2*

| Time in Minutes of Additional Heating in Gaseous Helium at 500° C. | Percent Change in Resistivity | Temperature Coefficient, p.p.m./° C. |
|---|---|---|
| 2 | −12 | +46 |
| 5 | −27 | +133 |
| 10 | −36 | +202 |
| 20 | −42 | +235 |

Further, in accordance with still another feature of this invention, the physical and/or electrical properties of a metal film can be effected by firing or heating the coated substrate material containing the metallic compounds applied thereon in solution form to an elevated temperature in the range 300–500° C. for a relatively short period of time, such as a time in the range 1–10 minutes in the presence of gaseous oxygen, such as air, before the above-described two cycle series of heat treatments. By employing the above-described prefiring treatment the resistivity of the resulting metal film can be increased and the temperature coefficient thereof decreased.

Metal films produced in the practices of this invention have a thickness in the range $2-20\times10^{-6}$ cm. The metal films prepared in accordance with this invention may be conveniently described in terms of resistance, e.g., ohms per square. Metal films prepared in accordance with this invention and having the composition 54% gold, 36% palladium, 10% iron exhibit a resistivity of from about 10 to about 50 ohms per square, when the liquid coating composition from which the metal film is derived is applied by writing or by direct contact of the substrate material from a liquid applicator. When the coating composition is applied to the substrate by spraying, the resulting metal films have a resistivity up to about 200 ohms per square. It has been observed that a good balance of stability and temperature coefficient are obtained with metal films having a resistivity of about 30 ohms per square.

As will be apparent to those skilled in the art in the light of the foregoing disclosure many modifications, changes and substitutions are possible in the practice of this invention without departing from the spirit or scope thereof.

What is claimed is:

1. A method which comprises forming a solution of gold resinate, palladium resinate and iron resinate, depositing said solution on an inert, relatively refractory surface and subjecting the thus deposited solution in a non-oxidizing environment to a relatively high temperature sufficient to thermally decompose each of the aforementioned resinates with the resulting production of the corresponding free metal and thereupon subjecting the resulting heat treated material to a relatively high temperature in the presence of free oxygen.

2. A method in accordance with claim 1 wherein said solution of gold, palladium and iron resinates contains a total of about 6% by weight of the above-mentioned metals.

3. A method comprising forming a solution of gold resinate, palladium resinate and iron resinate in the proportions in parts by weight of the aforesaid metals of about 54:36:10, gold, palladium and iron, respectively, depositing said solution on an inert, relatively refractory material, subjecting the resulting deposited solution to an elevated temperature and for a period of time and under conditions to effect the liberation of metallic gold, palladium and iron from the aforesaid deposited solution and subsequently subjecting the resulting librated metals to substantially the same conditions of temperature and time in the presence of free oxygen.

4. A method which comprises depositing a solution containing gold resinate, palladium resinate and iron resinate together with a minor amount of pale crepe rubber on the surface of an inert, relatively refractory material, said solution containing an admixture of carbon tetrachloride and cineole as a solvent and having a metal content of about 6% by weight, said metal content of said solution comprising gold, palladium and iron in the proportions 54:36:10 parts by weight, respectively, subjecting the thus deposited solution in an atmosphere comprising about 85% by volume nitrogen and 15% by volume hydrogen for about 10 minutes at an elevated temperature in the range about 300–500° C., permitting the thus heat treated material to cool in contact with air, subjecting the resulting cooled material to an elevated temperature in the range about 370–500° C. for about 8 minutes and repeating the two above-described heat treating operations in the above-described sequence.

5. A resistor comprising an inert, relatively refractory substrate structure, an elongated, composite, homogeneous film of metallic gold, palladium and iron formed on a surface of said structure, said gold, palladium and iron being in the proportions 20–70, 20–70 and 0.1–20 parts by weight, respectively, said homogeneous film having been formed by depositing a solution of gold resinate, palladium resinate and iron resinate, the metal content of said solution being composed of 20–70% by weight gold, 20–70% by weight palladium and 0.1–20% by weight iron on said surface of said structure, subjecting the thus-deposited solution in a non-oxidizing atmosphere to a relatively high temperature sufficient to thermally decompose each of the aforesaid resinates with the resulting production of the corresponding free metal and thereupon subjecting the resulting heat treated material to a relatively high temperature in the presence of free oxygen, and electrically conductive means operatively connected to the ends of said elongated homogeneous film.

6. A structure in accordance with claim 5 wherein gold, palladium and iron are present in said film in proportions of about 54:36:10 parts by weight, respectively.

7. A resistor in accordance with claim 5 wherein said homogeneous film and said electrically conductive means operatively connected to the ends of said homogeneous film are disposed such that said homogeneous film overlays said electrically conductive means.

8. A resistor in accordance with claim 5 wherein said electrically conductive means is a metallic silver-containing film and wherein said homogeneous film overlays said metallic silver film.

9. A resistor in accordance with claim 5 wherein said electrically conductive means is a tapering film of metallic silver and wherein said homogeneous film overlays the tapering portion of said metallic silver film.

References Cited by the Examiner

UNITED STATES PATENTS

| | | | |
|---|---|---|---|
| 1,312,262 | 9/19 | King | 252—512 |
| 1,946,231 | 2/34 | Nowack | 75—165 |
| 2,330,202 | 9/43 | Brennan | 117—227 |
| 2,440,691 | 5/48 | Jira | 117—227 |
| 2,689,294 | 9/54 | Weber et al. | 117—227 |
| 2,700,008 | 1/55 | Compton et al. | 117—40 |
| 2,843,781 | 7/58 | Kerstetter et al. | 252—512 |
| 2,855,493 | 10/58 | Tierman | 117—227 |
| 2,863,034 | 12/58 | Tassara | 117—227 |
| 2,926,325 | 2/60 | Moore et al. | 338—308 |
| 2,933,710 | 4/60 | Novak et al. | 338—308 |
| 2,946,679 | 7/60 | Darling | 75—165 |
| 2,947,623 | 8/60 | Lincoln | 75—165 |

FOREIGN PATENTS

| | | |
|---|---|---|
| 584,549 | 9/33 | Germany. |

RICHARD D. NEVIUS, *Primary Examiner.*

RAY K. WINDHAM, *Examiner.*